United States Patent
Carmi

(10) Patent No.: US 10,275,946 B2
(45) Date of Patent: Apr. 30, 2019

(54) VISUALIZATION OF IMAGING UNCERTAINTY

(71) Applicant: KONINKLIJKE PHILIPS N.V., Eindhoven (NL)

(72) Inventor: Raz Carmi, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 12 days.

(21) Appl. No.: 15/520,103

(22) PCT Filed: Oct. 21, 2015

(86) PCT No.: PCT/IB2015/058126
§ 371 (c)(1),
(2) Date: Apr. 19, 2017

(87) PCT Pub. No.: WO2016/063235
PCT Pub. Date: Apr. 28, 2016

(65) Prior Publication Data
US 2017/0309081 A1    Oct. 26, 2017

Related U.S. Application Data

(60) Provisional application No. 62/066,967, filed on Oct. 22, 2014.

(51) Int. Cl.
*G06T 19/20* (2011.01)
*G06T 19/00* (2011.01)
(Continued)

(52) U.S. Cl.
CPC .............. *G06T 19/20* (2013.01); *G06T 17/00* (2013.01); *G06T 19/00* (2013.01); *H04N 13/388* (2018.05);
(Continued)

(58) Field of Classification Search
None
See application file for complete search history.

(56) References Cited

U.S. PATENT DOCUMENTS 8,294,716 B2 * 10/2012 Lord .................. A61B 5/00
345/440
8,379,950 B2    2/2013 Ye
(Continued)

OTHER PUBLICATIONS

Grigoryan, Gevorg, and Penny Rheingans. "Point-based probabilistic surfaces to show surface uncertainty." IEEE Transactions on Visualization and Computer Graphics 10.5 (2004): 564-573.*
(Continued)

*Primary Examiner* — Michelle M Entezari

(57) ABSTRACT

A method includes obtaining volumetric image data generated by an imaging system, generating an uncertainty for each voxel of the volumetric image data, and generating an evaluation volume with volumetric image data based on the generated uncertainty. The method further includes receiving an input identifying a region and/or volume of interest in the evaluation volume, receiving an intended diagnostic type, receiving an evaluation probability level of interest, and receiving an effect direction of interest. The method further includes deforming the evaluation volume to create an artificial volume that reflects an effect of the uncertainty on the intended diagnostic type based on the evaluation probability level of interest and the effect direction of interest. The method further includes visually displaying the deformed evaluation volume.

21 Claims, 16 Drawing Sheets

(51) Int. Cl.
*G06T 17/00* (2006.01)
*H04N 13/388* (2018.01)
(52) U.S. Cl.
CPC .... *G06T 2210/41* (2013.01); *G06T 2219/028* (2013.01)

(56) References Cited

U.S. PATENT DOCUMENTS

| | | | |
|---|---|---|---|
| 2009/0028398 | A1 | 1/2009 | Lundstrom |
| 2010/0017182 | A1* | 1/2010 | Voros ................ G16B 20/00 703/11 |
| 2010/0131293 | A1* | 5/2010 | Linthicum ............ G06Q 50/24 705/3 |
| 2011/0060576 | A1* | 3/2011 | Sharma ................ G06T 7/0012 703/11 |
| 2012/0207359 | A1 | 8/2012 | Konukoglu |
| 2012/0320055 | A1 | 12/2012 | Pekar |
| 2014/0198979 | A1 | 7/2014 | Hamameh |

OTHER PUBLICATIONS

Kniss, et al., "Managing uncertainty in visualization and analysis of medical data", Biomedical Imaging: From Nano to Macro, 2008.
Amir-Khali Li Alborz et al: "Uncertainty-Encoded Augmented Reality for Robot-Assisted Partial Nephrectomy: A Phantom Study", Sep. 22, 2013 (Sep. 22, 2013), Correct System Design; [Lecture Notes in Computer Science; Lect.Notes Computer], Springer International Publishing, CHAM, pp. 182-191.
Ahmed Saad et al: "ProbExplorer: Uncertainty-guided Exploration and Editing of Probabilistic Medical Image Segmentation", Computer Graphics Forum, vol. 29, No. 3, Jun. 1, 2010.
D'Agostino et al, "An information theoretic approach for non-rigid image registration using voxel class probabilities", Medical Image Analysis, vol. 10, Issue 3, Jun. 2006, pp. 413-431.
Ye, et al., "A Bayesian Approach for False Positive Reduction in CTC CAD", Proceedings of MICCAI 2010 Workshop: Virtual Colonoscopy & Abdominal Imaging.
K. Potter et al., "From Quantification to Visualization: A Taxonomy of Uncertainty Visualization Approaches," In IFIP Advances in Information and Communication Technology Series, Springer, 2011.
Anette von Kapri et al., "Evaluating a Visualization of Uncertainty in Probabilistic Tractography", SPIE Medical Imaging 2010, Proc. of SPIE vol. 7625 762534.
Brett M Burton et al., "Uncertainty Visualization in Forward and Inverse Cardiac Models", Computing in Cardiology 2013.
Claes Lundstrom, "Uncertainty Visualization in Medical Volume Rendering Using Probabilistic Animation", IEEE Transactions on Visualization and Computer Graphics, vol. 13, No. 6, Nov./Dec. 2007.

* cited by examiner

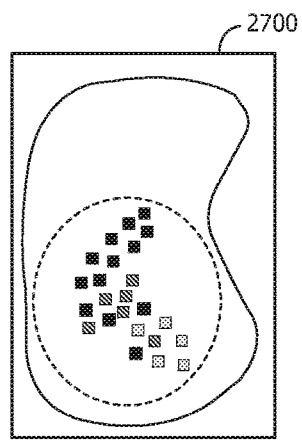
FIG. 27
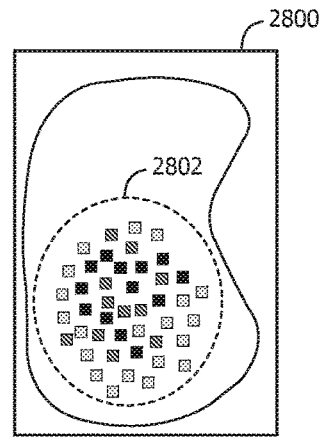
FIG. 28
0.87
FIG. 29
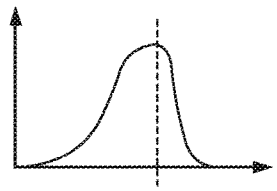
FIG. 30
0.73
FIG. 31

VISUALIZATION OF IMAGING UNCERTAINTY

CROSS REFERENCE TO RELATED APPLICATIONS

This application is the U.S. National Phase application under 35 U.S.C. § 371 of International Application No. PCT/IB2015/058126, filed Oct. 21, 2015, published as WO 2016/063235 on Apr. 28, 2016, which claims the benefit of U.S. Provisional Patent Application No. 62/066,967 filed Oct. 22, 2014. These applications are hereby incorporated by reference herein.

FIELD OF THE INVENTION

The following generally relates to image data visualization and, more particularly, to visualization of imaging uncertainty, and finds particular application to computed tomography (CT). However, the following is also amenable to other imaging modalities such as, but not limited to, X-ray, magnetic resonance (MR), single photon emission computed tomography (SPECT), positron emission tomography (PET), US, and/or other imaging modalities.

BACKGROUND OF THE INVENTION

Medical imaging data from modalities such as CT, X-ray, MR, SPECT, PET, US, etc. have various sources of uncertainty, which affect the reliability and accuracy of the diagnostic results. Besides image noise and imaging system accuracy limitations, the generation of different types of imaging biomarker maps or functional imaging maps may include significant uncertainties related to the calculation models and assumptions. For the purpose of medical diagnostics, it is common in clinical practice to visualize mainly the average or the most probable values (e.g. the conventional HU image in CT).

The literature has indicated that showing uncertainty, together with the image data, has been achieved through color maps, semi-transparency, and artificial overlay of special structures and textures. These approaches have included methods for sophisticated visualization techniques, which include both the clinical imaging information and the data uncertainty information. Unfortunately, these techniques produce complicated multi-parameter images that may not assist practical clinical diagnostics and that can be difficult to refine to make clinical decisions based on such visualization.

SUMMARY OF THE INVENTION

Aspects described herein address the above-referenced problems and others.

In one aspect, a method includes obtaining volumetric image data generated by an imaging system, generating an uncertainty for each voxel of the volumetric image data, and generating an evaluation volume with volumetric image data based on the generated uncertainty. The method further includes receiving an input identifying a region and/or volume of interest in the evaluation volume, receiving an intended diagnostic type, receiving an evaluation probability level of interest, and receiving an effect direction of interest. The method further includes deforming the evaluation volume to create an artificial volume that reflects an effect of the uncertainty on the intended diagnostic type based on the evaluation probability level of interest and the effect direction of interest. The method further includes visually displaying the deformed evaluation volume.

In another aspect, an imaging includes a memory configured to store computer executable instructions of an artificial volume generator module and a processor. The processor, in response to executing the computer executable instructions: generates an uncertainty for each voxel of a volumetric image data, generate an evaluation volume with volumetric image data based on the generated uncertainty, receives an input signal indicating a region and/or volume of interest in the evaluation volume, receives a diagnostic type, receives an evaluation probability level of interest, receives an effect direction of interest, deforms the evaluation volume to create an artificial volume that reflects an effect of the uncertainty on the diagnostic type based on the evaluation probability level of interest and the effect direction of interest, and visually displays the artificial volume.

In another aspect, a computer readable storage medium is encoded with computer readable instructions, which, when executed by a processor, causes the processor to: generate an uncertainty for each voxel of a volumetric image data, generate an evaluation volume with volumetric image data based on the generated uncertainty, receive an input signal indicating a region and/or volume of interest in the evaluation volume, receive a diagnostic type, receives an evaluation probability level of interest, receive an effect direction of interest, deform the evaluation volume to create an artificial volume that reflects an effect of the uncertainty on the diagnostic type based on the evaluation probability level of interest and the effect direction of interest, and visually display the artificial volume.

The invention may take form in various components and arrangements of components, and in various steps and arrangements of steps. The drawings are only for purposes of illustrating the preferred embodiments and are not to be construed as limiting the invention.

BRIEF DESCRIPTION OF THE DRAWINGS

FIGS. 27-31 show an example in connection with a global quantitative analysis of diagnostic results.

DETAILED DESCRIPTION OF EMBODIMENTS

The following describes an approach for visualizing how estimated imaging uncertainty can affect a particular type of intended clinical diagnostics. In one instance, a result provides a clinician a convenient way to assess a confidence of a particular diagnosis and related clinical decisions, which are based on medical imaging information.

Figure 1:
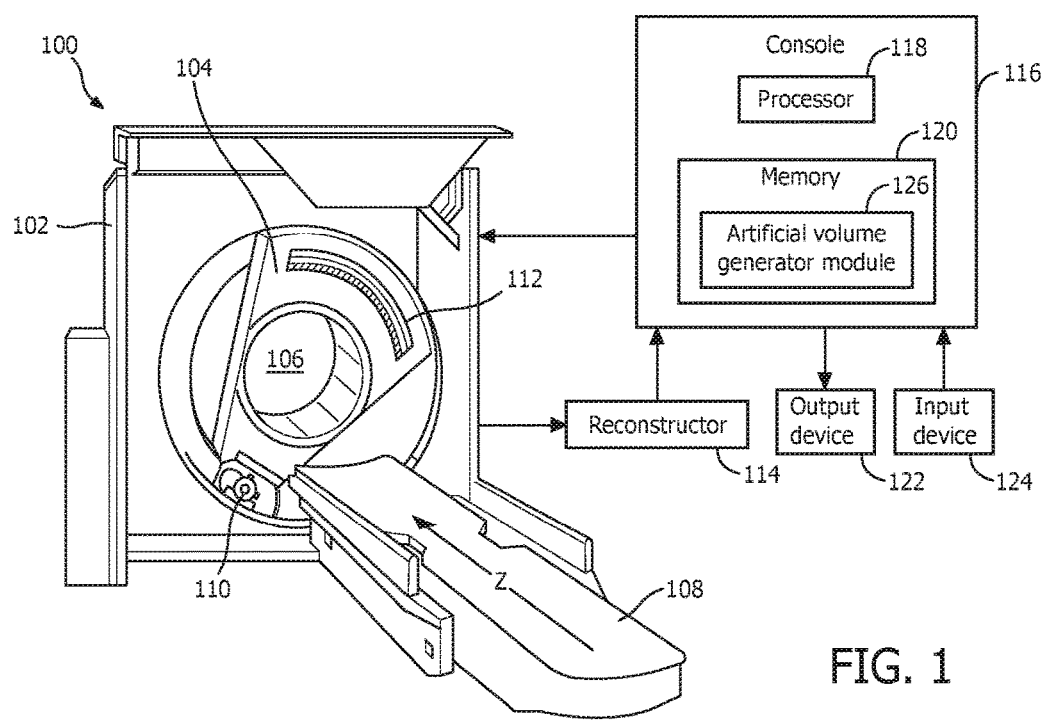
FIG. 1 schematically illustrates an example imaging system with an artificial volume generator module.

FIG. 1 schematically illustrates an example imaging system 100, such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis "Z". A subject support 108 supports a subject or an object in the examination region 106.

A radiation source 110, such as an x-ray tube, is rotatably supported by the rotating gantry 104, rotates with the rotating gantry 104, and emits x-ray radiation that traverses the examination region 106. A detector array 112 subtends an angular arc opposite the examination region 106 relative to the radiation source 110. The detector array 112 detects radiation that traverses the examination region 106 and generates a signal (projection data) indicative thereof. A reconstruction processor 114 reconstructs the signal and generates volumetric image data.

An operator console 116 includes a processor 118 (e.g., a microprocessor, a central processing unit, etc.) that executes a computer readable instruction stored in computer readable storage medium ("memory") 120, which excludes transitory medium and includes physical memory and/or other non-transitory medium. The microprocessor 118 may also execute a computer readable instruction carried by a carrier wave, a signal or other transitory medium. The console 116 further includes an output device(s) 122 such as a display monitor, a filmer, etc., and an input device(s) 124 such as a mouse, keyboard, etc.

In the illustrated example, the computer readable instruction is for an artificial volume generator module 126 that generates an artificial volume based on input volumetric image data. As described in greater detail below, in one instance, the artificial volume generator module 126 deforms volumetric image data to visually adapt the image data based on an uncertainty of a feature of interest. In one instance, the resulting deformed image visualizes how an estimated imaging uncertainty can affect clinical diagnostics. This may, e.g., provide a clinician with a convenient way to assess the confidence of a particular diagnosis and related clinical decision, where they are based on medical imaging information.

A conventional diagnostic process is usually done by reviewing the most probable, or average, image data (e.g. the conventional HU image in CT). For a particular potential disease or medical condition, the clinician usually looks for a certain image value distribution, special structures or textures, dimensions of particular shapes, and other image features. In the approach described herein, the estimated data uncertainty can be provided from the imaging modality software (or other software) and the type of intended diagnostic is determined for a particular image region or segment. With this, an artificially deformed image is calculated which gives an estimation on the potential miss-diagnosis due to the estimated uncertainty.

Figure 2:
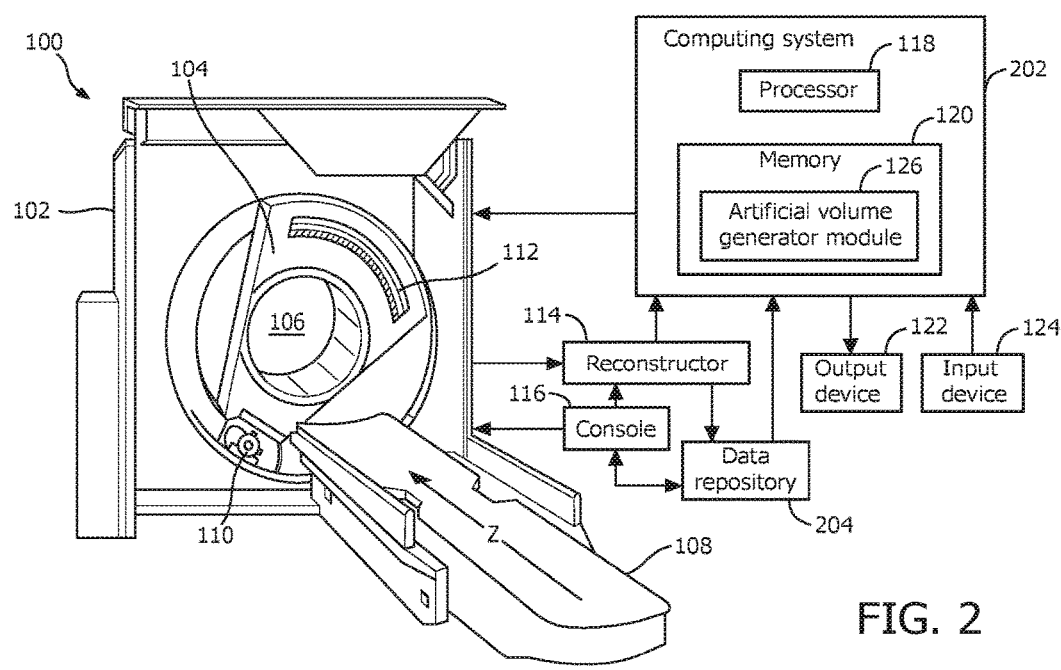
FIG. 2 schematically illustrates a variation of FIG. 1 in which the artificial volume generator module is part of a computing system.

FIG. 2 illustrates a variation of FIG. 1.

This variation includes a computing system 202, which includes the processor 118, the memory 120 with the artificial volume generator module 126, the output device 122, and the input device 124. The computing system 202 can be part of the imaging system 100 or separate from the imaging system 100. The raw data, the original volume and/or the artificial volume can be stored in a data repository 204. Examples of data repositories include a picture archiving and communication system (PACS), a radiology information system (RIS), a hospital information system (HIS), an electronic medical record (EMR), a database, a server, an imaging system, a computer and/or other data repository.

Figure 3:
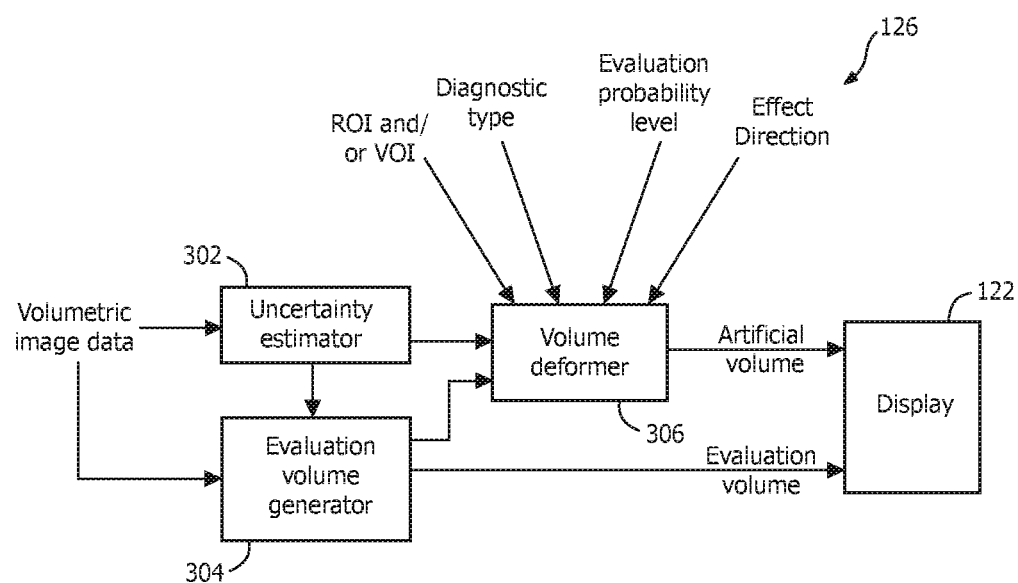
FIG. 3 schematically illustrates an example of the artificial volume generator module.

FIG. 3 illustrates an example of the artificial volume generator module 126.

The artificial volume generator module 126 receives, as an input, volumetric image data. An uncertainty estimator 302 generates an uncertainty for one or more voxels, one or more groups of voxels, and/or the entire input volumetric image data. The uncertainty, e.g., can be a map that provides, for each voxel, a probability for one or more visualization properties. An evaluation volume generator 304 generates an evaluation volume based on the input volumetric image and the uncertainty. For example, the evaluation volume may include mean voxels corresponding to a material class with the highest probabilities for the voxels, etc.

A volume deformer 306 deforms the evaluation volume based on at least the estimated uncertainties, an input indicative of a region and/or volume of interest, an input indicative of a diagnostic type of interest, an input indicative of a probability level of interest, and an input indicative an effect direction. Such information can be obtained from the memory 120 and/or an input from the input device 124. The region and/or volume of interest can be a sub-set of the volumetric image data set or the entire volumetric image data set and can be automatically and/or manually determined. The diagnostic type of interest identifies a characteristic(s) that affects the clinical result or a clinical decision taken by a user.

The effect direction indicates how the evaluation volume will be deformed, e.g., negative so that the artificial volume will be deformed to represent a less positive case, or positive so that the artificial volume will be deformed to represent a more positive case. For example, a more positive case may relate to a situation in which the examined disease is more severe. The evaluation probability level of interest is a threshold value or a relative value which is used to determine whether or not to deform the evaluation volume or in which amount to deform the evaluation volume. For example, for imitating the uncertainty effect on the diagnostic type of interest, a probability level of, e.g., 50-70% such as 60% may be selected for exploring a less positive result. The selection of 60% probability is equivalent to the probability of a one standard deviation shift in a Gaussian distribution. The probability percentage is applied to the output of the uncertainty estimator 302, e.g., an uncertainty map, in order to derive the actual uncertainty value per voxel which will be used in the volume deformation by the volume deformer 306.

The artificial volume and/or the evaluation volume are visually displayed. In one instance, this includes concurrently displaying the artificial volume and the evaluation volume non-overlapped within the viewing window such as side-by-side. In another instance, the artificial and the evaluation volume are alternatively and individually displayed in the viewing window. The user can switch back and forth between the individual volumes. In yet another instance, the artificial and the evaluation volume can be fused and/or otherwise combined into a single volume, e.g. using a semitransparent column overlay, and the single volume can be displayed in the viewing window.

The induced image deformation can be applied with such properties which can imitate either less-severe or more-severe diagnostic outcome. The original volume and the artificial volume can be visualized in a default or user preferred manner such that the impression on the potential diagnostic results is clearer than with common uncertainty visualization techniques. The approach can be applied on images with quantitative scale values such as in anatomical image or functional imaging maps, as well as categorical maps such as in classification and segmentation results.

Figure 4:
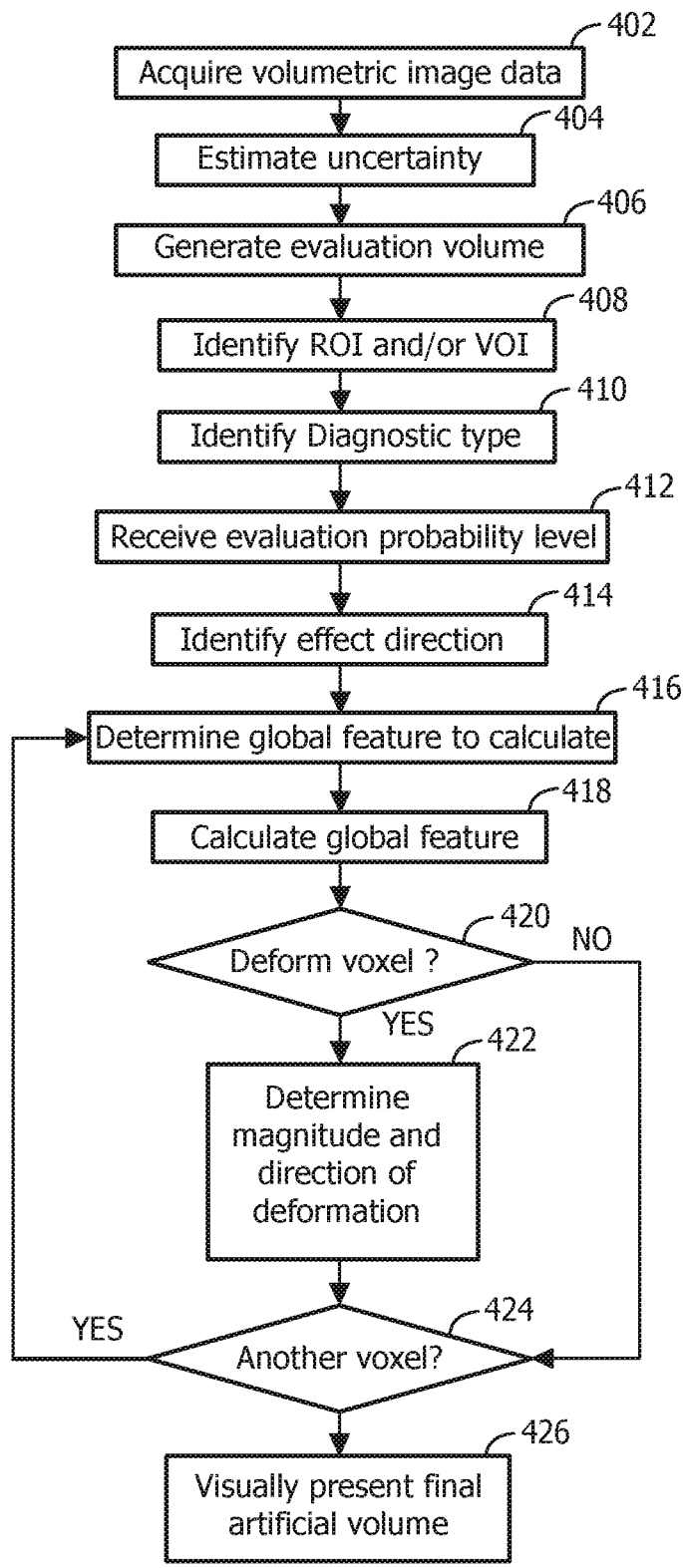
FIG. 4 illustrates an example method for visualizing uncertainty based on local volumetric values, either continuous, or non-continuous or discrete.

FIG. 4 illustrates an example method for visualizing uncertainty using imaging information based on local volumetric values, either continuous, or non-continuous or discrete.

It is to be appreciated that the ordering of the acts in the methods described herein is not limiting. As such, other orderings are contemplated herein. In addition, one or more acts may be omitted and/or one or more additional acts may be included.

At 402, volumetric image data is acquired, e.g., from the imaging system 100, the data repository 204, and/or other device.

At 404, an estimation of volumetric local uncertainty distribution of the volumetric image data is determined.

At 406, an evaluation volume is generated based on the volumetric image data and the local uncertainty distribution.

At 408, a region and/or volume of interest is identified in the evaluation volume.

At 410, a diagnostic type is identified. In this example, the diagnostic type indicates a characteristic of interest that makes the result a positive (or negative) result.

At 412, an evaluation probability level of interest is received.

At 414, an effect direction is identified. A negative effect will result in an artificial volume that represents a less positive case, and a positive effect will result in an artificial volume that represents a more positive case.

At 416, a type of the global features of a voxel surrounding to be calculated is determined.

At 418, the type of the global features of the voxel surrounding is calculated.

At 420, it is determined if the voxel value should be deformed based on the evaluation probability level of interest and on the calculated global features of the voxel surrounding.

If it is determined that the voxel value should be deformed, then at 422 a magnitude and a direction of the value deformation is determined, based on the diagnostic type and the effect direction, for the region and/or volume of interest.

At 424, if it is determined that the voxel value should not be deformed or if a voxel is deformed, it is determined if another voxel is to be evaluated.

If it is determined that another voxel is to be evaluated, then act 416 is repeated.

If at 424 it is determined that no other voxel is to be evaluated, then at 426 the artificial volume is visually presented.

Optionally, prior to act 426, a model can be determined to maintain conditions of the diagnostic image and applied to the volume to produce a final volume.

Figure 5:
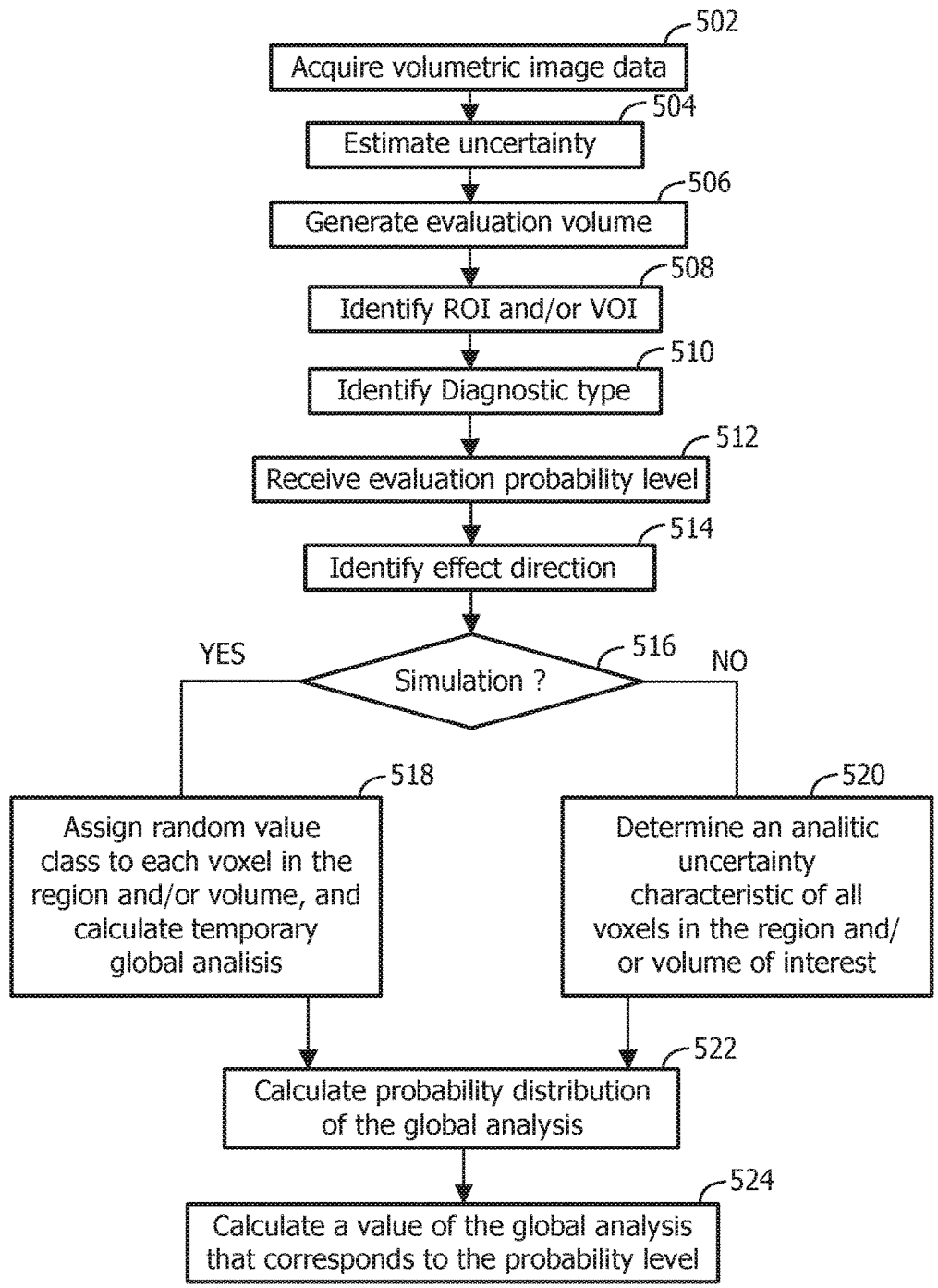
FIG. 5 illustrates an example method for visualizing uncertainty based on derived categorical or textual values.

FIG. 5 illustrates an example method for visualizing uncertainty using imaging information based on derived categorical or textual values.

It is to be appreciated that the ordering of the acts in the methods described herein is not limiting. As such, other orderings are contemplated herein. In addition, one or more acts may be omitted and/or one or more additional acts may be included.

At 502, volumetric image data is acquired, e.g., from the imaging system 100, the data repository 204, and/or other device.

At 504, an estimation of volumetric local uncertainty distribution of the volumetric image data is determined.

At 506, an evaluation volume is generated based on the volumetric image data and the local uncertainty distribution.

At 508, a region and/or volume of interest is identified in the evaluation volume.

At 510, a diagnostic type is identified. In this example, the diagnostic type indicates a characteristic of interest that make the result a positive (or negative) result.

At 512, an evaluation probability level of interest is received.

At 514, an effect direction is identified. A negative effect will result in an artificial volume that represents a less positive case, and a positive effect will result in an artificial volume that represents a more positive case.

At 516, it is determined whether a simulation or analytic analysis is to be performed.

If a simulation analysis is selected, then at 518 a random value/class is assigned to each voxel in the region and/or volume of interest based on its uncertainty distribution and a temporary global analysis is calculated. The process is repeated for a pre-determined number of times, and the values of all simulation repetitions are recorded.

If an analytic analysis is selected, then at 520 an analytic uncertainty characteristic of all voxels in the region and/or volume of interest is determined.

At 522, a probability distribution of the global analysis result is calculated. Where the simulation analysis is selected at 516, the recorded values are used, for example, to create a histogram.

At 524, a value of the global analysis that corresponds to the probability level is calculated.

It is to be understood that the artificial volume is not the same as applying statistical noise on the original volume. Furthermore, as an image as a whole, it is not a likely practical result since the effecting uncertainty is directional and not random. However, it enables the user to have an impression in a single simple image representation on what could happen in any location due to the uncertainty and how it may affect the intended diagnostics.

In a variation, multiple regions are selected for one clinical case with corresponding multiple definitions. Furthermore, the uncertainty properties may have correlations between voxels.

FIGS. 6-11 illustrate example user cases of the artificial volume generator module 126.

Figure 6:
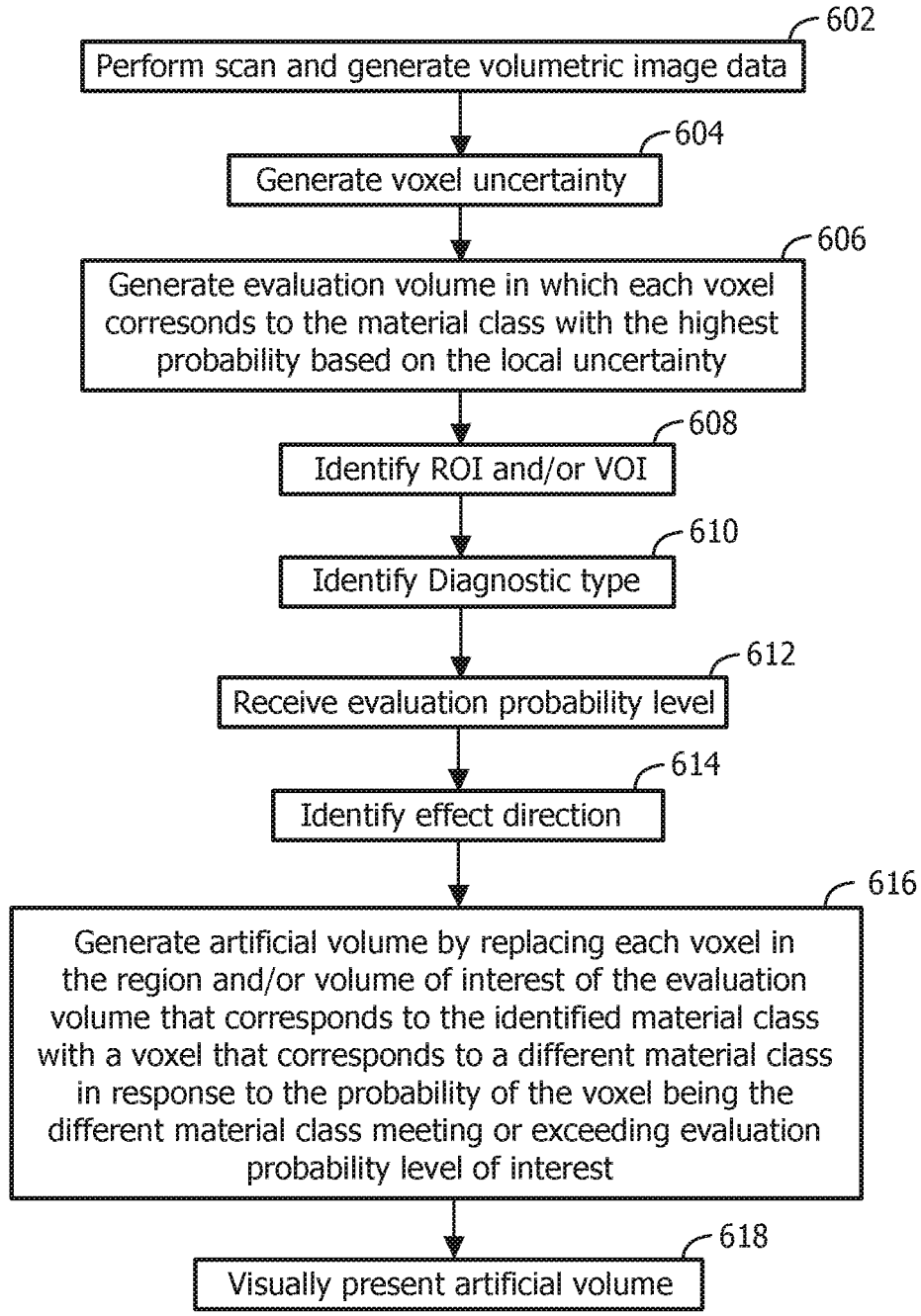
FIG. 6 illustrates an example method for visualizing uncertainty in connection with classification.

FIG. 6 illustrates an example method in connection with classification.

It is appreciated that the ordering of the acts in the methods described herein is not limiting. As such, other orderings are contemplated herein. In addition, one or more acts may be omitted and/or one or more additional acts may be included.

At 602, a scan is performed, generating volumetric image data.

At 604, a voxel uncertainty is generated that provides, for each voxel of the volumetric image data, a probability for each of a multiple different material classes. In this respect, a material can be a biological tissue or a chemical compound, or an effect of a material, or its functionality which is indicated by imaging signal.

At 606, an evaluation volume is generated in which each voxel corresponds to the material class with a highest probability based on the local uncertainty.

At 608, a region and/or volume of interest is identified in the evaluation volume.

At 610, a diagnostic type is identified. In this example, the diagnostic type indicates a material class of interest that represents the material class which will result in a positive diagnostic result.

At 612, an evaluation probability level of interest is received, as described herein and/or otherwise.

At 614, an effect direction is identified. In this example, the effect direction is negative, meaning the evaluation volume will be deformed to represent a less positive case based on the evaluation probability level of interest, if deformed at all.

At 616, an artificial volume is generated by replacing each voxel in the region and/or volume of interest of the evaluation volume that corresponds to the identified material class with a voxel that corresponds to a different material class in response to the probability of the voxel being the different material class meeting or exceeding the evaluation probability level of interest. Voxels corresponding to a material class other than the identified material class (s) are not replaced. The artificial volume will include a same or less number of voxels corresponding to the identified material class of interest, representing a less positive case.

If the probability of multiple different material classes meets or exceeds the evaluation probability level of interest, the voxel is replaced with the voxel for the material class with the greatest probability. If at least two different material classes have a same probability and a highest probability, the voxel is replaced with a randomly selected one of the voxels for the at least two different material classes. In one instance, a spatial filter is applied to the artificial volume to smooth the volume based on a predetermined voxel coherence length, e.g., 2.5 voxels, as each voxel is replaced independent of other voxels. A re-discretization is then applied to the filtered data to produce a final artificial volume.

At 618, the artificial volume is visually presented.

Figure 7:
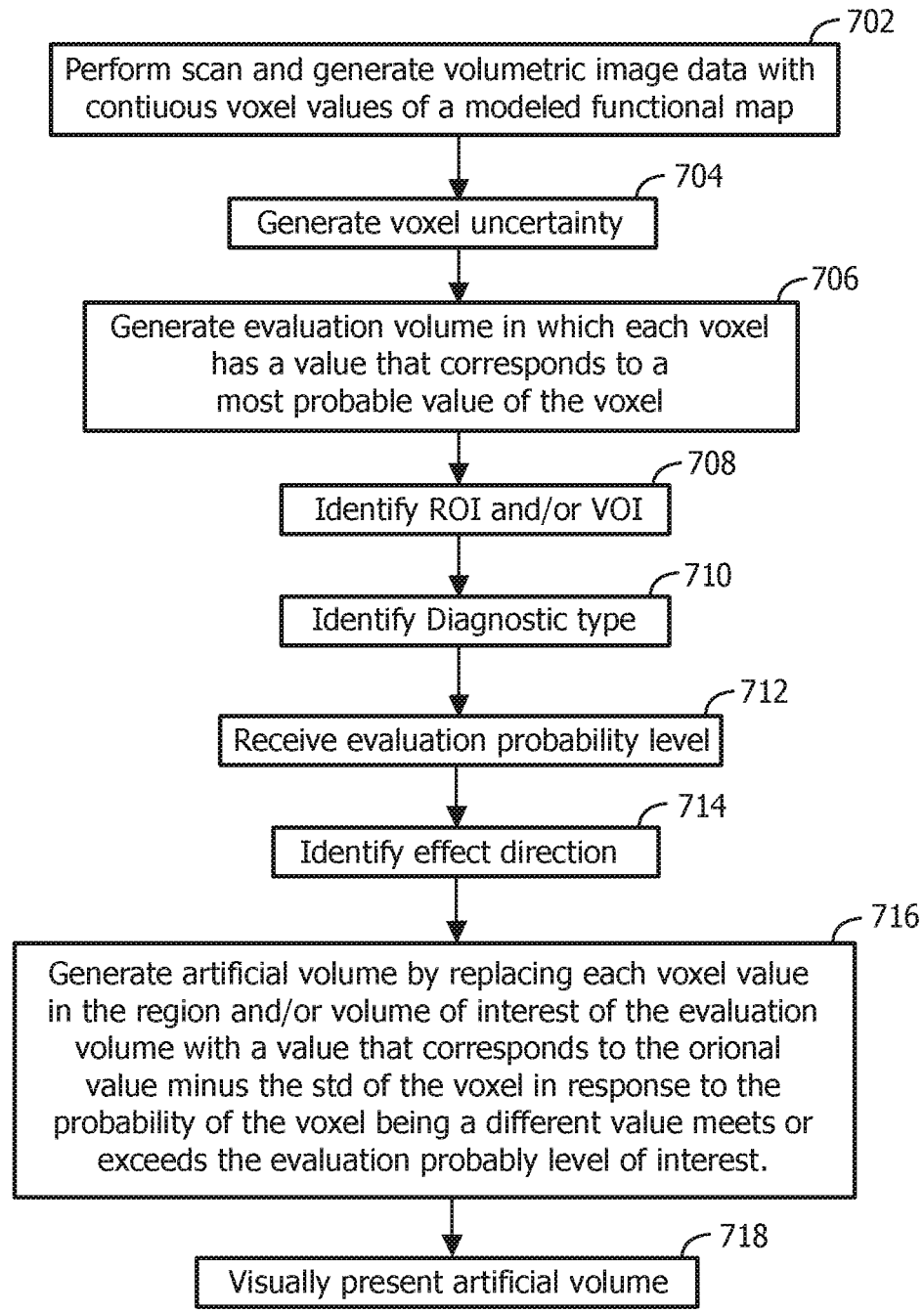
FIG. 7 illustrates an example method for visualizing uncertainty in connection with scalar values.

FIG. 7 illustrates an example method in connection with scalar values.

It is to be appreciated that the ordering of the acts in the methods described herein is not limiting. As such, other orderings are contemplated herein. In addition, one or more acts may be omitted and/or one or more additional acts may be included.

At 702, a scan is performed, generating volumetric image data with continuous voxel values of a modeled functional map.

At 704, an uncertainty is generated that provides, for each voxel of the volumetric image data, a probability distribution for having different values. If a known probability distribution is determined (e.g., a Gaussian probability distribution), a single characteristic such as a standard deviation can be assigned for each voxel. The probability distribution may be non-symmetric.

At 706, an evaluation volumetric image data set is generated in which each voxel has a value that corresponds to a most probable value of the voxel.

At 708, a region and/or volume of interest is identified in the evaluation volume.

At 710, a diagnostic type is identified. In this example, the diagnostic type indicates a higher voxels values represent a positive diagnostic result and lower voxels values represent a negative diagnostic result.

At 712, an evaluation probability level of interest is received, as described herein and/or otherwise.

At 714, an effect direction is identified. In this example, the effect direction is negative, meaning the evaluation volume will be deformed to represent a less positive case based on the evaluation probability level of interest, if deformed at all.

At 716, an artificial volume is generated by replacing each voxel value in the region and/or volume of interest of the evaluation volume with a value that corresponds to the original value minus the STD of the voxel in response to the probability of the voxel being a different value meets or exceeds the evaluation probability level of interest.

Optionally, this is done for all voxel values, and act 712 is omitted. Optionally, a spatial filter is applied as discussed in connection with FIG. 6.

At 718, the artificial volume is visually presented.

Figure 8:
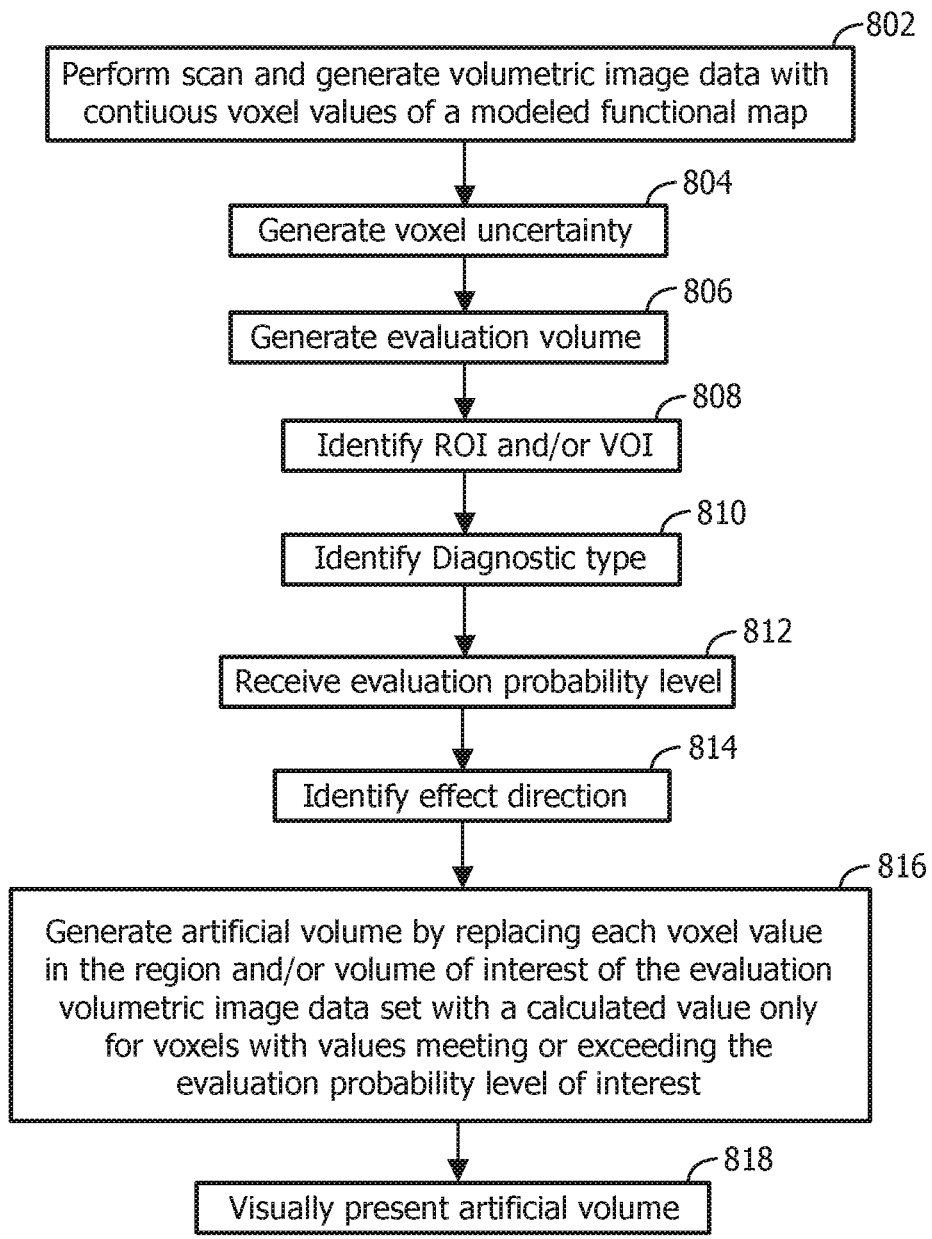
FIG. 8 illustrates an example method for visualizing uncertainty in connection with texture or structure analysis.

FIG. 8 illustrates an example method in connection with texture or structure analysis.

It is to be appreciated that the ordering of the acts in the methods described herein is not limiting. As such, other orderings are contemplated herein. In addition, one or more acts may be omitted and/or one or more additional acts may be included.

At 802, a scan is performed, generating volumetric image data with continuous voxel values of a modeled functional map, e.g., as described and/or otherwise.

At 804, an uncertainty is generated, e.g., as described herein and/or otherwise.

At 806, an evaluation volumetric image data set is generated.

At 808, a region and/or volume of interest is identified in the evaluation volume.

At 810, an intended diagnostic type is received. For this example, the intended diagnostic type assigns a more positive clinical result in response to more of the voxels being heterogeneous and irregular in their value spatial distribution.

At 812, an evaluation probability level of interest is received, as described herein and/or otherwise.

At 814, an effect direction is identified. In this example, the effect direction is negative, meaning the evaluation volume will be deformed to represent a less positive case based on the evaluation probability level of interest, if deformed at all.

At 816, an artificial volume is generated by replacing each voxel value in the region and/or volume of interest of the evaluation volumetric image data set with a calculated value only for voxels with values meeting or exceeding the evaluation probability level of interest. The replacement value is calculated by calculating a mean of the values of all voxels in a determined spatial region around a voxel of interest (e.g., a sphere or other volume with predetermined radius of interest, e.g., in mm). If the value of a central voxel is higher than the mean, then the value is reduced by its uncertainty STD, and if the value of the central voxel is lower than the mean, then the value is increased by its uncertainty STD. Optionally, a spatial filter is applied as discussed in connection with FIG. 6.

At 818, the artificial volume is visually presented.

Figure 9:
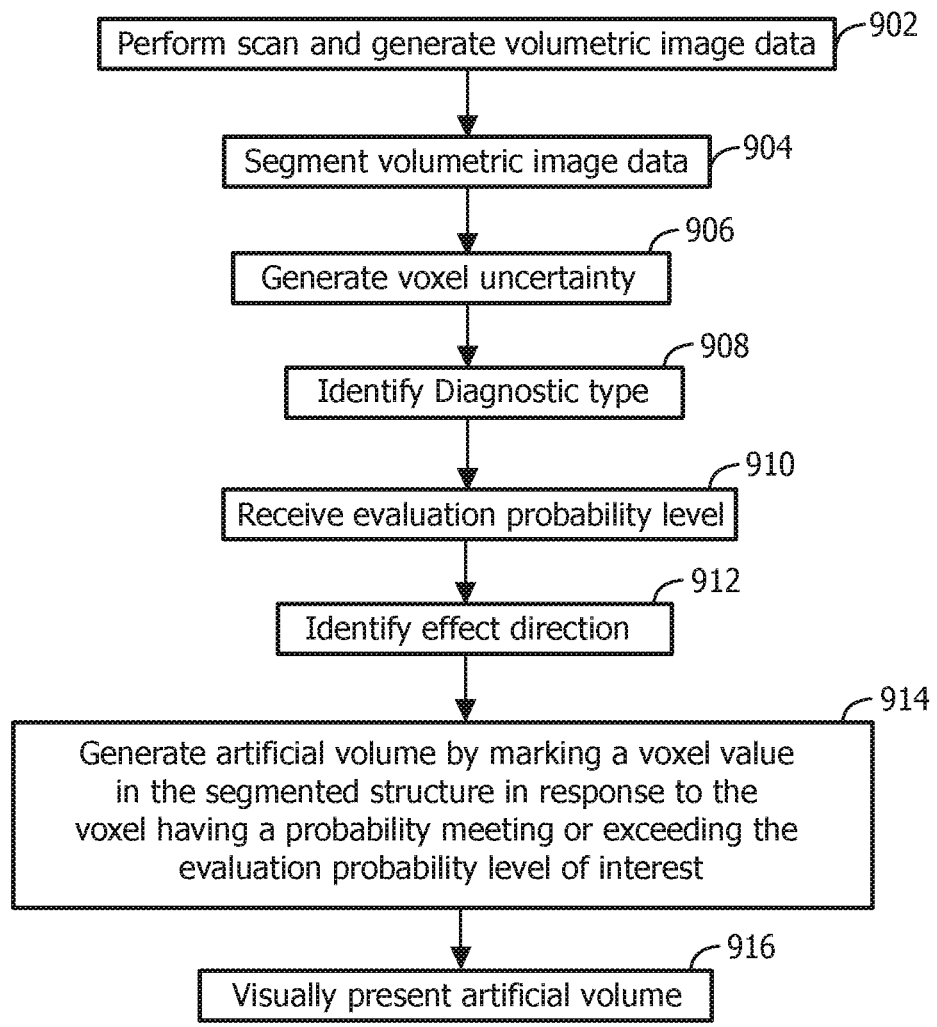
FIG. 9 illustrates an example method for visualizing uncertainty in connection with segmentation.

FIG. 9 illustrates an example method in connection with segmentation.

It is to be appreciated that the ordering of the acts in the methods described herein is not limiting. As such, other orderings are contemplated herein. In addition, one or more acts may be omitted and/or one or more additional acts may be included.

At 902, a scan is performed, generating volumetric image data.

At 904, the volumetric image data is segmented based on a segmentation model, creating an evaluation volume.

At 906, an uncertainty is generated that provides, for each voxel of the volumetric image data, a probability to be included or excluded from the segmented structure. For example, if a voxel is outside the segmented structure but very close to it, it may have a probability to being included, just slightly smaller than the probability of being excluded. If a voxel is well within the segmented structure it may have a very low probability of being excluded.

At 908, an intended diagnostic type is received. For this example, the intended diagnostic type assigns a more positive clinical result to larger segmented structures.

At 910, an evaluation probability level of interest is received. In this example, the evaluation probability level of interest corresponds to a probability of the voxel being outside of the segmented structure At 912, an effect direction is identified, as described herein and/or otherwise.

At 914, an artificial volume is generated by marking a voxel value in the segmented structure in response to the voxel having a probability meeting or exceeding the evaluation probability level of interest. For voxels which are already out of the segmented structure, the original value is unchanged. In this example, the segmentation defines the region and/or volume of interest.

Optionally, where there is a constraint on the shape of the segmented structure (e.g. smoothness of the shape surface), and a morphological operation is applied to meet with the prior constraints.

At 916, the artificial volume is visually presented.

Figure 10:
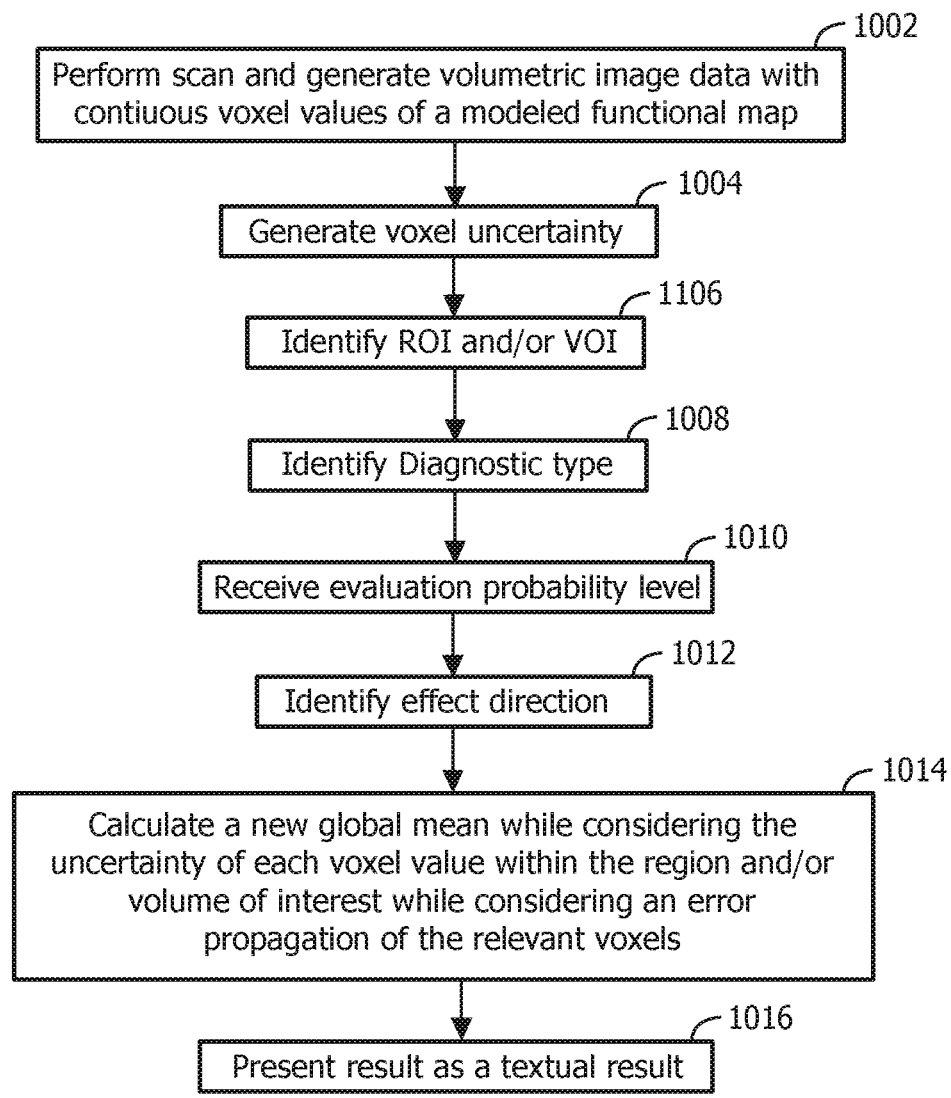
FIG. 10 illustrates an example method for visualizing uncertainty in connection with global region analysis of continuous scalar data.

FIG. 10 illustrates an example method in connection with global region analysis of continuous scalar data.

It is to be appreciated that the ordering of the acts in the methods described herein is not limiting. As such, other orderings are contemplated herein. In addition, one or more acts may be omitted and/or one or more additional acts may be included.

At 1002, volumetric image data with continuous voxel values of a modeled functional map is received.

At 1004, an uncertainty is generated, e.g., as described herein and/or otherwise.

At 1006, a region and/or volume of interest is identified in the evaluation volume.

At 1008, an intended diagnostic type is received. For this example, the intended diagnostic type is based on a global analysis of a selected region of interest; for example, the mean of all voxel values in this region. The intended diagnostic, in this example, assigns a positive clinical result as more as the regional mean is higher.

At 1010, an evaluation probability level of interest is received, as described herein and/or otherwise.

At 1012, an effect direction is identified, as described herein and/or otherwise.

At 1014, a new global mean is calculated while considering the uncertainty of each voxel value within the region and/or volume of interest while considering an error propagation of the relevant voxels. For example, if there are 'N' voxels within the selected ROI, and each has a Gaussian uncertainty estimation with STD of 'e', and the selected probability level is p, then the mean STD is $e/(N^{1/2})$, and the modified regional mean can be calculated from p and a Gaussian distribution with STD of $e/(N^{1/2})$.

At 1016, a result is presented as a textual result.

Figure 11:
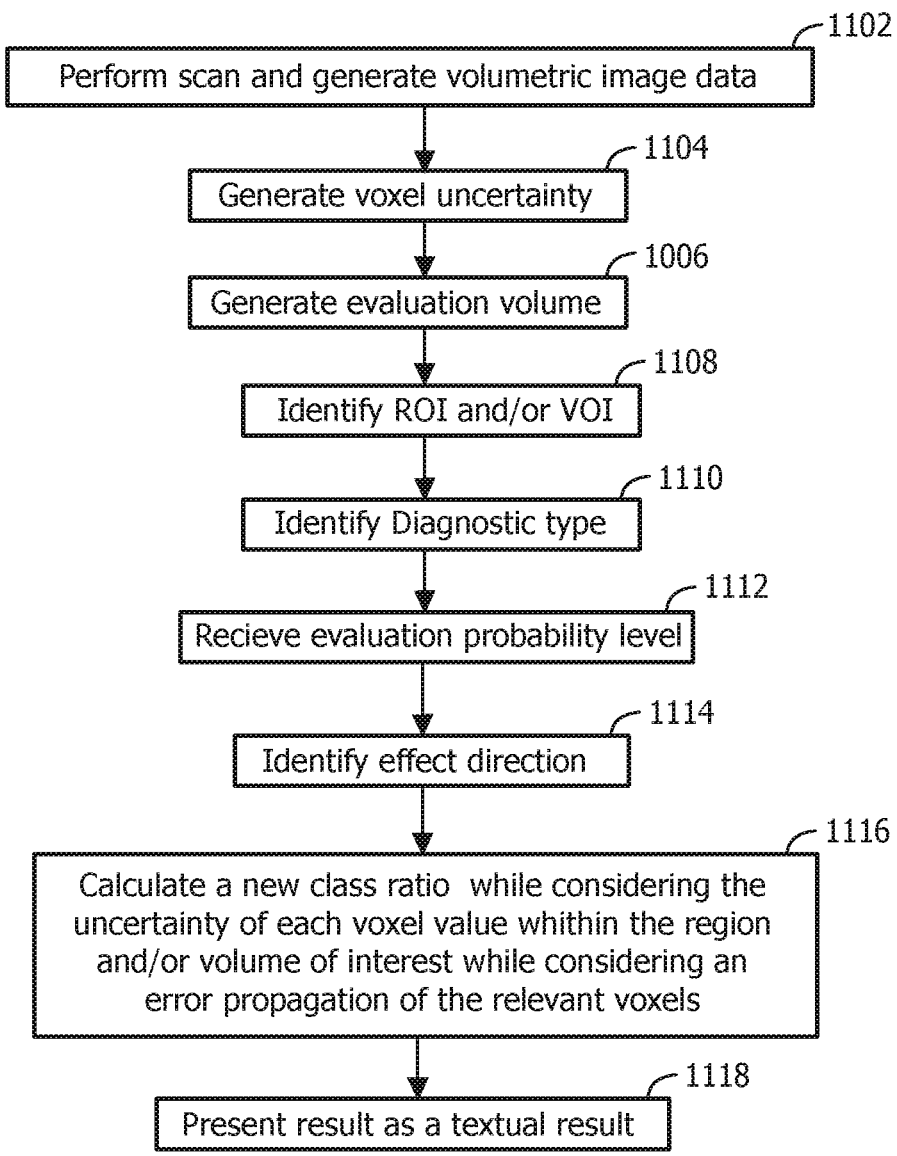
FIG. 11 illustrates an example method for visualizing uncertainty in connection with global region analysis of classification data.

FIG. 11 illustrates an example method in connection with global region analysis of classification data.

It is to be appreciated that the ordering of the acts in the methods described herein is not limiting. As such, other orderings are contemplated herein. In addition, one or more acts may be omitted and/or one or more additional acts may be included.

At 1102, a scan is performed, generating volumetric image data.

At 1104, an uncertainty map is generated, as discussed herein and/or otherwise.

At 1106, an evaluation volume is generated, as discussed herein and/or otherwise.

At 1108, a region and/or volume of interest is identified in the evaluation volume.

At 1110, an intended diagnostic type is received. In this example, the intended diagnostic type is based on a global analysis of a selected region of interest; for example, a ratio of voxels corresponding to a material class of interest in the region and/or volume of interest relative to the sum of all classes. The intended diagnostic assigns a positive clinical result as more as the regional ratio of the material class of interest is higher.

At 1112, an evaluation probability level of interest is received, as described herein and/or otherwise.

At 1114, an effect direction is identified. In this example, the effect direction is negative, meaning the evaluation volume will be deformed to represent a less positive case based on the evaluation probability level of interest, if deformed at all.

At 1116, a new class ratio is calculated while considering the uncertainty of each voxel value within the region and/or volume of interest while considering an error propagation of the relevant voxels.

In case of multi-classification uncertainty, a Monte-Carlo simulation can be performed, wherein, in each iteration, each voxel in the region gets a value based on its uncertainty distribution. In each iteration, the global analysis is performed and the result is saved. The results of all iterations give a global probability distribution of the global analysis result, and from that the value which is related to the determined probability level can be found.

At 1118, a result is presented as a textual result.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

FIGS. 12-31 illustrate several examples.

Figure 12:
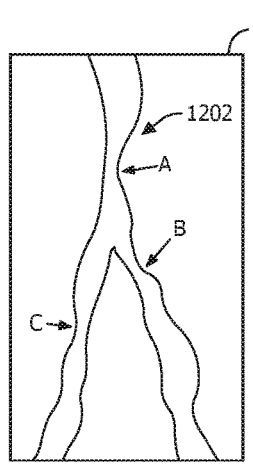
FIGS. 12-15 show an example in connection with narrowing of arteries.
Figure 13:
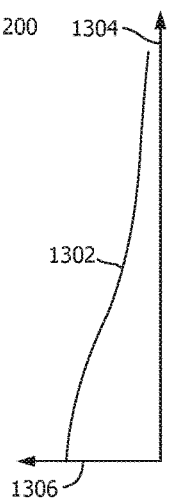
Figure 14:
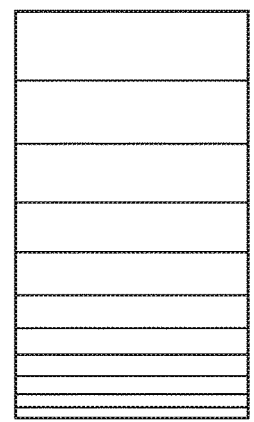
Figure 15:
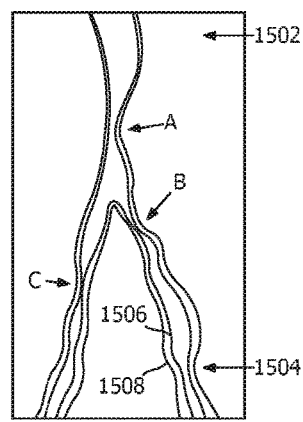

The example of FIGS. 12-15 relates to narrowing of arteries (e.g. coronary arteries) in cardiac CT. FIG. 12 shows an original diagnostic image 1200 with voxels representing blood vessels 1202 enhanced by contrast agent. A, B and C indicate narrow regions at risk. FIG. 13 show information on the estimated imaging uncertainty 1302. A y-axis 1304 represents the Z-direction, and an x-axis 1306 represents uncertainty level (e.g., STD of Gaussian). FIG. 14 shows a line density representation of the uncertainty level. FIG. 15 shows the resulting artificial image. The artificial image represents a deformed image showing the effect of the explored uncertainty on the vessel narrowing. In FIG. 15, region 1502 represents small deformation due to small uncertainty and region 1504 represents large deformation due to large uncertainty. A perimeter 1506 represents the artificial image, and a perimeter 1508 represents the original image.

For the deformation, the target region is the coronary arteries, the type of intended diagnostics is narrowing of blood vessels, the probability level of affecting uncertainty is a pre-determined percentage (e.g. 60%), the effect is a positive direction (i.e. explore more narrowing), and a type of the global features of a voxel surrounding is a presence of contrast agent. For each voxel surrounding, a threshold is calculated for which values above it are considered as having contrast agent. For those voxels with contrast agent, the voxel value is reduced based on the determined probability level and local uncertainty input estimation (but not less than the threshold value).

Figure 16:
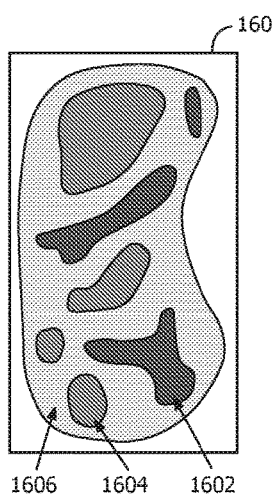
FIGS. 16-19 show an example in connection with classification of segmented regions into different tissue classes.
Figure 17:
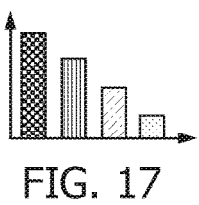
Figure 18:
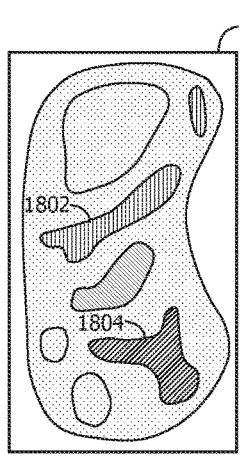
Figure 19:
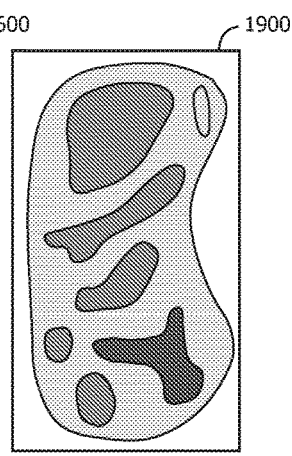

The example of FIGS. 16-19 relates to classification of segmented regions into different tissue classes, e.g. identifying of cancerous region in the liver. FIG. 16 shows an original diagnostic image 1600 with tissue region classification within an organ, classified into 3 discrete classes, class 1 1602, class 2 1604 and class 3 1606. FIG. 17 shows a probability of being a class-1. FIG. 18 shows a region 1802 classified as class 1 in the image 1600 with a medium confidence, and a region 1804 classified as class 1 in the image 1600 with a high confidence. FIG. 19 shows an artificially deformed image 1900 showing an effect of the explored uncertainty on the obtaining class-1 regions.

For the deformation, the target region is a selected organ, the type of intended diagnostics is a classification of class-1 tissues (more class-1 regions corresponds to positive diagnosis), the selected probability level of affecting uncertainty is a determined percentage, and the effect is in a negative direction (i.e. explore less class-1 detection). For each classified region (as a whole): if a region of class-1 has sufficiently large probability to be classified as another class, based on the selected probability level, then replace the original class with the other class. For voxels with classes 2 or 3, don't change the original values (in this case of negative affecting uncertainty).

Figure 20:
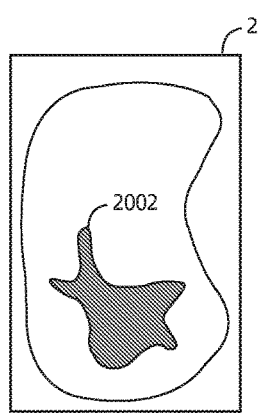
FIGS. 20-23 show an example in connection including dimensions of segmented region corresponding to a selected tissue types.
Figure 21:
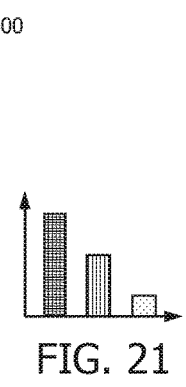
Figure 22:
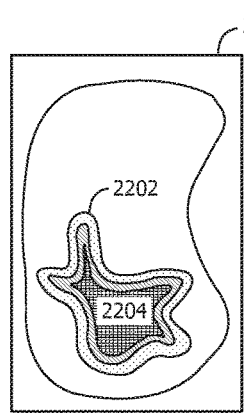
Figure 23:
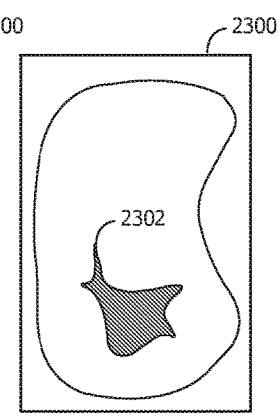

The example of FIGS. 20-23 includes dimensions of segmented region corresponding to a selected tissue types, e.g. volume of a tumor lesion. FIG. 20 shows an original diagnostic image 2000 showing segmented tissue 2002 within an organ. FIG. 21 shows a probability of being part of the segmented tissue. FIG. 22 shows voxels 2202 in the diagnostic image with low confidence to be included in the segment, and voxels 2204 in the diagnostic image with high confidence to be included in the segment. FIG. 23 shows an artificially deformed image showing the effect of the explored uncertainty on the dimensions of the segmented region, in this case, a smaller segmented region 2302 is obtained.

For the deformation, the type of intended diagnostics is dimensions of segmented region (large segment corresponds to positive diagnosis), the selected probability level of affecting uncertainty is a determined percentage, and the effect is in a negative direction (i.e. explore smaller segment). For those voxels which are inside the original segmented region, exclude the voxel from being in the segment, based on the selected probability level and local uncertainty input estimation.

Figure 24:
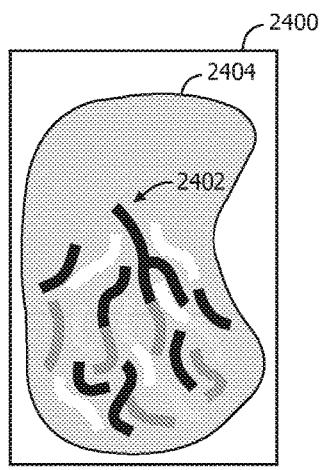
FIGS. 24-26 show an example in connection with texture or fine-structure of tissue of interest.
Figure 25:
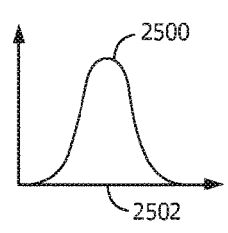
Figure 26:
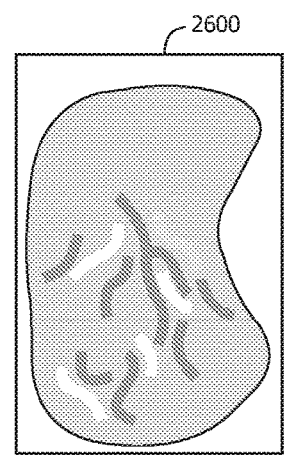

The example of FIGS. 24-26 relates to texture or fine-structure of tissue of interest (e.g. texture and structure of the lung parenchyma in different lung diseases). FIG. 24 shows an original diagnostic image 2400 showing fine-structured tissue 2402 within an organ 2404. FIG. 25 shows estimated imaging uncertainty per each voxel where each voxel has the same Gaussian uncertainty distribution 2500 around a mean 2502 prediction. FIG. 26 shows an artificially deformed image 2600 showing the effect of the explored uncertainty on the tissue texture, which, in this case, is less tissue irregularity and heterogeneity.

For the deformation, the target region is the selected tissue region, the type of intended diagnostics is assign positive clinical result as more as the local map values are heterogeneous and irregular, the selected probability level of affecting uncertainty is a determined percentage, the effect is in a negative direction (i.e. explore less irregularity and heterogeneity), and the type of the global features of a voxel surrounding: for each voxel calculate the mean of the values of all voxels in a determined spatial region around this certain voxel (e.g. a sphere with radius of several mm). If the value of the central voxel is higher than the local mean, then its value is reduced based on the selected probability level (but not less than the local mean). If the value of the voxel is lower than the mean, then its value is increased (but not more than the local mean).

The example of FIGS. 27-31 includes a global quantitative analysis of diagnostic results (e.g. functional blood perfusion analysis). FIG. 27 shows an original diagnostic image 2700 in phase 1, and FIG. 28 shows the original diagnostic image 2800 in phase 2. The phases may be, for example, two different scans or two different time frames in a dynamic scan or two different analysis procedures. In FIG. 28, region 2802 represents a region of interest for analysis. Inside of the region 2802 are continuous voxel values. FIG. 29 shows a numerical quantitative diagnostic result. FIG. 30 shows information on the estimated imaging uncertainty per each voxel. Here, each voxel has the same non-symmetric uncertainty distribution, around the max probable value prediction. The information indicates possible voxel values, where the most probable value is the value from the original diagnostic image. FIG. 31 shows an artificially deformed numerical quantitative diagnostic result. In this case, lower than the original diagnostic result.

For the deformation, the target region is the ROI, the type of intended diagnostics is to calculate the mean voxel value within a drawn ROI for two imaging phases by calculating a ratio of the result from phase-1 and the result from phase-2 and assign positive clinical result as more as the ratio is higher, and the selected probability level of affecting uncertainty is a determined percentage, the effect is in a negative direction. The algorithm considers the uncertainty distribution of each voxel within the selected ROI, and a new ratio is calculated while considering the error propagation of the relevant voxels. The result is presented as a new numerical result. For calculating the error propagation, a Monte-Carlo simulation can be done, where in each iteration, each voxel in the region gets a value based on its uncertainty distribution. In each iteration the global analysis is performed (i.e. the ratio calculation, in this case) and the result is saved. The results of all iterations give a global probability distribution of the global analysis result, and from that the value which is related to the determined probability level can be found.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
 obtaining volumetric image data generated by an imaging system, wherein the imaging system is selected from the group consisting of a computed tomography system, an X-ray system, a magnetic resonance system, a single photon emission computed tomography system, or an ultrasound system;
 generating an uncertainty for each voxel of the volumetric image data;
 generating an evaluation volume with volumetric image data based on the generated uncertainty;
 receiving an input signal indicating a region or volume of interest in the evaluation volume;
 receiving a diagnostic type that identifies a characteristic that effects a clinical result or decision;
 receiving an evaluation probability level of interest;
 receiving an effect direction of interest, wherein the effect direction is a negative effect direction or a positive effect direction;
 deforming the evaluation volume to create an artificial volume that reflects an effect of the uncertainty on the diagnostic type based on the evaluation probability level of interest and the effect direction of interest, wherein for the negative effect direction the deforming deforms the evaluation volume to represent a negative clinical result or decision, and for the positive effect direction the deforming deforms the evaluation volume to represent a positive clinical result or decision; and
 visually displaying the artificial volume.

2. The method of claim 1, further comprising:
 visually displaying, concurrently, the artificial volume and the evaluation volume in non-overlapped regions of a viewing window.

3. The method of claim 1, further comprising:
 visually displaying, alternatively, the artificial volume and the evaluation volume in a viewing window.

4. The method of claim 1, further comprising:
 fusing the artificial volume and the evaluation volume to form a single volume; and
 visually displaying the single fused volume in a viewing window.

5. The method of claim 1, wherein the diagnostic type corresponds to a material class, and the artificial volume is generated by replacing each voxel in a region or volume of interest of the evaluation volume that corresponds to the material class with a voxel that corresponds to a different material class in response to the probability of the voxel being the different material class meeting or exceeding the evaluation probability level of interest.

6. The method of claim 5, wherein voxels corresponding to a material class other than the identified material class (s) are not replaced.

7. The method of claim 1, wherein the diagnostic type indicates higher voxels values represent a positive diagnostic result and lower voxels values represent a negative diagnostic, and the artificial volume is generated by replacing each voxel value in a region or volume of interest of the evaluation volume with a value that corresponds to an original voxel value minus a standard deviation of the voxel.

8. The method of claim 7, wherein a voxel value in the region or volume of interest of the evaluation volume is replaced only in response to the probability of the voxel being a different value meeting or exceeding the evaluation probability level of interest.

9. The method of claim 1, wherein the diagnostic type indicates a more positive clinical result in response to more of the voxels being heterogeneous and irregular, and the artificial volume is generated by replacing each voxel value in a region or volume of interest of the evaluation volume with a calculated value only for voxels with values meeting or exceeding the evaluation probability level of interest.

10. The method of claim 9, wherein the replacement value is calculated by calculating a mean of the values of voxels in a pre-determined spatial region around a voxel of interest, and reducing the value by its uncertainty standard deviation if a central voxel is higher than the mean, and increasing the value by its uncertainty standard deviation if the central voxel is lower than the mean.

11. The method of claim 1, wherein the diagnostic type indicates a more positive clinical result in response to a larger segmented structure, and the artificial volume is generated by marking a voxel value in the segmented structure in response to the voxel having a probability meeting or exceeding the evaluation probability level of interest, wherein voxels that are already out of the segmented structure are unchanged.

12. The method of claim 1, wherein the diagnostic type is based on a global analysis of a selected region of interest, and the artificial volume is calculated while considering the uncertainty of each voxel value within a region or volume of interest while considering an error propagation of the relevant voxels.

13. The method of claim 1, wherein the diagnostic type is based on a ratio of voxels corresponding to a material class of interest in a region or volume of interest relative to a sum of all voxel classes, and the artificial volume is calculated by creating a new class ratio is calculated while considering the uncertainty of each voxel value within the region and/or volume of interest while considering an error propagation of the relevant voxels.

14. An imaging system, comprising:
 a memory configured to store computer executable instructions of an artificial volume generator module; and
 a processor, which, in response to executing the computer executable instructions:
  generates an uncertainty for each voxel of a volumetric image data, wherein the volumetric image data is generated by a system selected from the group consisting of a computed tomography system, an X-ray system, a magnetic resonance system, a single photon emission computed tomography system, or an ultrasound system;
  generate an evaluation volume with volumetric image data based on the generated uncertainty;
  receives an input signal indicating a region and/or volume of interest in the evaluation volume;
  receives a diagnostic type that identifies a characteristic that effects a clinical result or decision;
  receives an evaluation probability level of interest;
  receives an effect direction of interest, wherein the effect direction is a negative effect direction or a positive effect direction;
  deforms the evaluation volume to create an artificial volume that reflects an effect of the uncertainty on the diagnostic type based on the evaluation probability level of interest and the effect direction of interest, wherein for the negative effect direction the deforming deforms the evaluation volume to represent a negative clinical result or decision, and for the positive effect direction the deforming deforms the evaluation volume to represent a positive clinical result or decision; and
visually displays the artificial volume.

15. The imaging system of claim 14, wherein the diagnostic type corresponds to a material class, and the processor creates the artificial volume by replacing each voxel in a region or volume of interest of the evaluation volume that corresponds to the material class with a voxel that corresponds to a different material class in response to the probability of the voxel being the different material class meeting or exceeding the evaluation probability level of interest.

16. The imaging system of claim 14, wherein the diagnostic type indicates higher voxels values represent a positive diagnostic result and lower voxels values represent a negative diagnostic, and the processor creates the artificial volume by replacing each voxel value in a region or volume of interest of the evaluation volume with a value that corresponds to an original voxel value minus a standard deviation of the voxel.

17. The imaging system of claim 14, wherein the diagnostic type indicates a more positive clinical result in response to more of the voxels being heterogeneous and irregular, and the processor creates the artificial volume by replacing each voxel value in a region or volume of interest of the evaluation volume with a calculated value only for voxels with values meeting or exceeding the evaluation probability level of interest, wherein the replacement value is calculated by calculating a mean of the values of voxels in a pre-determined spatial region around a voxel of interest, and reducing the value by its uncertainty standard deviation if a central voxel is higher than the mean, and increasing the value by its uncertainty standard deviation if the central voxel is lower than the mean.

18. The imaging system of claim 14, wherein the diagnostic type indicates a more positive clinical result in response to a larger segmented structure, and the processor marks a voxel value in the segmented structure in response to the voxel having a probability meeting or exceeding the evaluation probability level of interest, wherein voxels that are already out of the segmented structure are unchanged.

19. The imaging system of claim 14, wherein the diagnostic type is based on a global analysis of a selected region of interest, and the processor creates the artificial volume while considering the uncertainty of each voxel value within a region or volume of interest while considering an error propagation of the relevant voxels.

20. The imaging system of claim 14, wherein the diagnostic type is based on a ratio of voxels corresponding to a material class of interest in a region or volume of interest relative to a sum of all voxel classes, and the processor creates the artificial volume by creating a new class ratio is calculated while considering the uncertainty of each voxel value within the region and/or volume of interest while considering an error propagation of the relevant voxels.

21. A non-transitory computer readable storage medium encoded with computer readable instructions, which, when executed by a processor, causes the processor to:
generates an uncertainty for each voxel of a volumetric image data, wherein the volumetric image data is generated by a system selected from the group consisting of a computed tomography system, an X-ray system, a magnetic resonance system, a single photon emission computed tomography system, or an ultrasound system;
generate an evaluation volume with volumetric image data based on the generated uncertainty;
receives an input signal indicating a region and/or volume of interest in the evaluation volume;
receives a diagnostic type that identifies a characteristic that effects a clinical result or decision;
receives an evaluation probability level of interest;
receives an effect direction of interest, wherein the effect direction is a negative effect direction or a positive effect direction;
deforms the evaluation volume to create an artificial volume that reflects an effect of the uncertainty on the diagnostic type based on the evaluation probability level of interest and the effect direction of interest, wherein for the negative effect direction the deforming deforms the evaluation volume to represent a negative clinical result or decision, and for the positive effect direction the deforming deforms the evaluation volume to represent a positive clinical result or decision; and
visually displays the artificial volume.

* * * * *